United States Patent
Rathbone et al.

(10) Patent No.: US 10,002,041 B1
(45) Date of Patent: Jun. 19, 2018

(54) SYSTEM AND METHOD FOR MAINTAINING THE HEALTH OF A MACHINE

(71) Applicant: JPMorgan Chase Bank, N.A., New York, NY (US)

(72) Inventors: Alexis Rathbone, London (GB); Craig A. Ritchie, Surrey (GB); Andrew J. Groothedde, Tadworth (GB); Paul McEwen, New York, NY (US); Nej Adamian, North Harrow (GB)

(73) Assignee: JPMorgan Chase Bank, N.A., New York, NY (US)

( * ) Notice: Subject to any disclaimer, the term of this patent is extended or adjusted under 35 U.S.C. 154(b) by 43 days.

(21) Appl. No.: 13/756,677

(22) Filed: Feb. 1, 2013

(51) Int. Cl.
   *G06F 11/07* (2006.01)
(52) U.S. Cl.
   CPC .............................. *G06F 11/0793* (2013.01)
(58) Field of Classification Search
   CPC ............ G06F 11/0793; G06F 11/2028; G06F 11/1458; G06F 11/1662; G06F 11/0709
   USPC ...................................................... 714/6.13
   See application file for complete search history.

(56) References Cited

U.S. PATENT DOCUMENTS

| | | |
|---|---|---|
| 4,751,702 A | 6/1988 | Beier et al. |
| 5,027,269 A | 6/1991 | Grant et al. |
| 5,075,881 A | 12/1991 | Blomberg et al. |
| 5,313,616 A | 5/1994 | Cline et al. |
| 5,347,518 A | 9/1994 | Lee |
| 5,386,551 A | 1/1995 | Chikira et al. |
| 5,446,895 A | 8/1995 | White et al. |
| 5,539,885 A | 7/1996 | Ono et al. |
| 5,549,117 A | 8/1996 | Tacklind et al. |
| 5,563,998 A | 10/1996 | Yakish et al. |
| 5,566,297 A | 10/1996 | Devarakonda |
| 5,594,863 A | 1/1997 | Stiles |
| 5,630,047 A | 5/1997 | Wang |
| 5,630,069 A | 5/1997 | Flores et al. |
| 5,655,074 A | 8/1997 | Rauscher |
| 5,701,471 A | 12/1997 | Subramanyam |
| 5,712,971 A | 1/1998 | Stanfill et al. |

(Continued)

FOREIGN PATENT DOCUMENTS

WO    01/74043    10/2001

OTHER PUBLICATIONS

Alessandra Agostini et al, A light workflow management system using simple process models, Computer Supported Cooperative Work, pp. 335-363 (Nov. 2000).

(Continued)

*Primary Examiner* — Jigar Patel
(74) *Attorney, Agent, or Firm* — Calfee, Halter & Griswold LLP

(57) ABSTRACT

Systems and methods for maintaining the health of a client machine are provided. One or more trigger specifications, each having pre-defined threshold values representative of desired parameters for optimal operation, may be associated with the client machine. Trigger specifications may be monitored, in real-time or according to a schedule, to ascertain a health status of the client machine. When a threshold value of a trigger specification is exceeded, a health-risk event may be detected on the client machine and a plug-in associated with the trigger specification may be deployed to resolve the detected health-risk event.

16 Claims, 7 Drawing Sheets

(56) References Cited

U.S. PATENT DOCUMENTS

| | | | |
|---|---|---|---|
| 5,721,913 A | 2/1998 | Ackroff et al. |
| 5,721,914 A | 2/1998 | De Vries |
| 5,748,878 A | 5/1998 | Rees et al. |
| 5,752,034 A | 5/1998 | Srivastava |
| 5,758,061 A | 5/1998 | Plum |
| 5,768,506 A | 6/1998 | Randell |
| 5,781,448 A | 7/1998 | Nakamura et al. |
| 5,784,562 A | 7/1998 | Diener |
| 5,799,297 A | 8/1998 | Goodridge et al. |
| 5,806,075 A | 9/1998 | Jain et al. |
| 5,828,883 A | 10/1998 | Hall |
| 5,835,770 A | 11/1998 | Shum et al. |
| 5,842,196 A | 11/1998 | Agarwal et al. |
| 5,845,292 A | 12/1998 | Bohannon et al. |
| 5,872,976 A | 2/1999 | Yee et al. |
| 5,884,037 A | 3/1999 | Aras et al. |
| 5,903,721 A | 5/1999 | Sixtus |
| 5,903,897 A | 5/1999 | Carrier, III et al. |
| 5,920,719 A | 7/1999 | Sutton et al. |
| 5,937,198 A | 8/1999 | Nelson et al. |
| 5,960,196 A | 9/1999 | Carrier, III et al. |
| 5,960,445 A | 9/1999 | Tamori et al. |
| 5,995,965 A | 11/1999 | Experton |
| 6,003,075 A | 12/1999 | Arendt et al. |
| 6,009,274 A | 12/1999 | Fletcher et al. |
| 6,026,237 A | 2/2000 | Berry et al. |
| 6,028,938 A | 2/2000 | Malkin et al. |
| 6,029,002 A | 2/2000 | Afifi et al. |
| 6,058,393 A | 5/2000 | Meier et al. |
| 6,061,503 A | 5/2000 | Chamberlain |
| 6,061,686 A | 5/2000 | Gauvin et al. |
| 6,067,412 A | 5/2000 | Blake et al. |
| 6,073,107 A | 6/2000 | Minkiewicz et al. |
| 6,088,700 A | 7/2000 | Larsen et al. |
| 6,101,601 A | 8/2000 | Matthews et al. |
| 6,108,673 A | 8/2000 | Brandt et al. |
| 6,125,390 A | 9/2000 | Touboul |
| 6,128,708 A | 10/2000 | Fitzpatrick et al. |
| 6,138,112 A | 10/2000 | Slutz |
| 6,145,121 A | 11/2000 | Levy et al. |
| 6,167,534 A | 12/2000 | Straathof et al. |
| 6,175,833 B1 | 1/2001 | West et al. |
| 6,195,676 B1 | 2/2001 | Spix et al. |
| 6,230,319 B1 | 5/2001 | Britt, Jr. et al. |
| 6,237,035 B1 | 5/2001 | Himmel et al. |
| 6,237,143 B1 | 5/2001 | Fontana et al. |
| 6,243,862 B1 | 6/2001 | Lebow |
| 6,247,029 B1 | 6/2001 | Kelley et al. |
| 6,249,877 B1 | 6/2001 | Kawakami et al. |
| 6,269,479 B1 | 7/2001 | Puram |
| 6,279,039 B1 | 8/2001 | Bhat et al. |
| 6,301,701 B1 | 10/2001 | Walker et al. |
| 6,311,327 B1 | 10/2001 | O'Brien et al. |
| 6,363,499 B1 | 3/2002 | Delo et al. |
| 6,363,524 B1 | 3/2002 | Loy |
| 6,405,250 B1 | 6/2002 | Lin et al. |
| 6,405,364 B1 | 6/2002 | Bowman-Amuah |
| 6,411,910 B1 | 6/2002 | Eulau et al. |
| 6,424,981 B1 | 7/2002 | Isaac et al. |
| 6,438,749 B1 | 8/2002 | Chamberlain |
| 6,446,126 B1 | 9/2002 | Huang et al. |
| 6,463,454 B1 | 10/2002 | Lumelksy et al. |
| 6,466,980 B1 | 10/2002 | Lumelksy et al. |
| 6,467,052 B1 | 10/2002 | Kaler et al. |
| 6,470,464 B2 | 10/2002 | Bertram et al. |
| 6,477,471 B1 | 11/2002 | Hedstrom et al. |
| 6,502,207 B1 | 12/2002 | Itoh et al. |
| 6,505,176 B2 | 1/2003 | DeFrancesco, Jr. et al. |
| 6,513,154 B1 | 1/2003 | Porterfield |
| 6,519,763 B1 | 2/2003 | Kaufer et al. |
| 6,526,443 B1 | 2/2003 | Goldsmith et al. |
| 6,546,506 B1 | 4/2003 | Lewis |
| 6,560,580 B1 | 5/2003 | Fraser et al. |
| 6,578,004 B1 | 6/2003 | Cimral et al. |
| 6,578,006 B1 | 6/2003 | Saito et al. |
| 6,584,447 B1 | 6/2003 | Fox et al. |
| 6,587,841 B1 | 7/2003 | DeFrancesco, Jr. et al. |
| 6,601,017 B1 | 7/2003 | Kennedy et al. |
| 6,601,018 B1 | 7/2003 | Logan |
| 6,601,233 B1 | 7/2003 | Underwood |
| 6,626,953 B2 | 9/2003 | Johndrew et al. |
| 6,629,266 B1 | 9/2003 | Harper et al. |
| 6,820,088 B1 | 11/2004 | Hind et al. |
| 6,826,745 B2 | 11/2004 | Coker et al. |
| 6,920,467 B1 | 7/2005 | Yoshimoto |
| 6,934,934 B1 | 8/2005 | Osborne, II et al. |
| 2002/0004912 A1 | 1/2002 | Fung |
| 2002/0133593 A1 | 9/2002 | Johnson et al. |
| 2002/0133757 A1 | 9/2002 | Bertram et al. |
| 2002/0138571 A1 | 9/2002 | Trinon et al. |
| 2002/0143929 A1 | 10/2002 | Maltz et al. |
| 2002/0147961 A1 | 10/2002 | Charters et al. |
| 2002/0162090 A1 | 10/2002 | Parnell et al. |
| 2002/0165754 A1 | 11/2002 | Tang et al. |
| 2003/0004848 A1 | 1/2003 | Hellerstein et al. |
| 2003/0018952 A1 | 1/2003 | Roetzheim |
| 2003/0033586 A1 | 2/2003 | Lawler |
| 2003/0041000 A1 | 2/2003 | Zajac et al. |
| 2003/0065644 A1 | 4/2003 | Horman et al. |
| 2003/0120539 A1 | 6/2003 | Korium et al. |
| 2003/0144868 A1 | 7/2003 | MacIntyre et al. |
| 2003/0188290 A1 | 10/2003 | Corral |
| 2003/0196190 A1 | 10/2003 | Ruffalo et al. |
| 2003/0212518 A1 | 11/2003 | De'Alessandro et al. |
| 2003/0225662 A1 | 12/2003 | Horan et al. |
| 2003/0225663 A1 | 12/2003 | Horan et al. |
| 2005/0071807 A1 | 3/2005 | Yanai |
| 2005/0160468 A1* | 7/2005 | Rodriguez ............... G06F 3/14 725/109 |
| 2006/0047669 A1* | 3/2006 | Durrence et al. ............... 707/10 |
| 2007/0239730 A1* | 10/2007 | Vigelette ............... G06F 21/305 |
| 2008/0133749 A1* | 6/2008 | Sample ............... 709/224 |
| 2008/0189578 A1* | 8/2008 | Raghuraman et al. ......... 714/47 |
| 2010/0057844 A1* | 3/2010 | Johnson ............... G06F 3/0611 709/203 |
| 2012/0291132 A1* | 11/2012 | Kline et al. ............... 726/25 |
| 2013/0290775 A1* | 10/2013 | Tucek et al. ............... 714/6.22 |

OTHER PUBLICATIONS

Betwixt: Turning beans into XML, http://web.archive.org/web/20020620000410/http://jakarta.apache.org/commons/betwixt (last visited Nov. 13, 2005).

Claes Wohlin et al, Understanding the Sources of Software Defects: A Filtering Approach (Abstract), 8th Int'l Workshop on Program Comprehension, p. 9 (2000).

CSK Software AG, Business Process Automation and Workflow in the Financial Industry (2003).

D.M. Hilbert et al, An approach to large-scale collection of application usage data over the internet (Abstract), Proc. Int'l Conf. Software Engineering, pp. 136-145 (1998).

David S. Lindsay, Software Evaluation, Tests, and Measurements (Abstract), in ACM Computing Rev. (J.E. Sammet, ed.), p. 519 (1981).

Dimitrious Georgakopoulos et al, An Overview of Workflow Management: From Process Modeling to Workflow Automation Infrastructure, Distributed and Parallel Databases, pp. 119-153 (1995).

Drake E. Lundell Jr. et al, Computer Use—an executive's guide (Abstract), in ACM Computing Rev. (M.A. Duggan, ed.), pp. 48-49 (1974).

Esmond Pitt et al, java.rmi: The Remove Method Invocation Guide, Section 3.5 (2001).

ExoLab Group, Using Castor XML, http://web.archive.org/web/20010827042213/http://www.castor.org/xml_framework.html (last visited Nov. 11, 2005).

Graham Hamilton, ed., Sun Microsystems JavaBeans API Specification, pp. 54-82 (1997).

IBM Corporation, Code Generation for Database Applications, IBM Tech. Disclosure Bulletin 03-92 (Mar. 1992).

IBM Corporation, OS/2 EE Database Manager SQLJRA Remote Protocol, IBM Tech. Disclosure Bulletin 01-93, pp. 33-36 (Apr. 1993).

(56) References Cited

OTHER PUBLICATIONS

J.P. Hudepohl et al, Integrating metrics and models for software risk assessment (Abstract), 7th Int'l Conf. Software Reliability Engineering, p. 93 (1996).
Len Reinhart, Liability management: A new tool for financial consultants, Financial Consultant (Fall/Winter 1996).
Mary Campione et al, Java Tutorial: A Short Course on the Basics, Ch. 5 (3d ed. 2000).
Norman E. Fenton et al, A Critique of Software Defect Prediction Models, IEEE Transactions Software Engineering, pp. 675-689 (Sep./Oct. 1999).
S.G. Linkman, Quantitative monitoring of software development by time-based and intercheckpoint monitoring (Abstract), Software Engineering J., pp. 43-49 (Jan. 1990).
Sanjay Mohapatra et al, Defect Prevention through Defect Prediction: A Case Study at Infosys (Abstract), IEEE Int'l Conf. Software Maintenance, p. 260 (2001).
Steve McConnell, Gauging Software Readiness with Defect Tracking, IEEE Software (May/Jun. 1997).
Sybase Inc., Monitor Client Library 12.5 Progammer's Guide (May 2001).
Tze-Jie Yu et al, An Analysis of Several Software Defect Models, IEEE Transactions Software Engineering, pp. 1261-1270 (Sep. 1988).
V. Basili et al, Understanding and predicting the process of software maintenance releases (Abstract), 18th Int'l Conf. Software Engineering, p. 464 (1996).
Ytzhak Levendel, Reliability Anlaysis of Large Software Systems: Defect Data Modeling, IEEE Transactions Software Engineering, pp. 141-152 (Feb. 1990).

\* cited by examiner

SYSTEM AND METHOD FOR MAINTAINING THE HEALTH OF A MACHINE

TECHNICAL FIELD

Embodiments of the invention relate generally to computer system management and, more specifically, to maintaining the operational health of machines on a computer network.

BACKGROUND

Presently, there is little or no monitoring of the health of machines on a computer network. Generally, machines on a computer network are monitored by human operators who are alerted to detected problems on a machine-by-machine basis as they arise. This approach requires a large investment in human resources trained to recognize and resolve the underlying issues resulting in these problems, which in turn can increase the operational costs of a business. Moreover, human operators are prone to mistakes, which can result in further end-user frustration and potential loss of data.

Accordingly, an improved system and method for maintaining the health of a client machine on a computer network is needed.

SUMMARY OF THE INVENTION

The present invention is directed at systems and methods for maintaining the health of a machine. A client machine may be monitored, in real-time or according to a schedule, to ascertain a health status of the client machine. When a determination is made that the client machine is not operating within desired parameters, as may be defined by a plurality of trigger specifications associated with the client machine, notifications may be generated to inform end users of a health-risk event detected on the client machine. If the detected health-risk event is not timely resolved, purpose-specific plug-ins configured to resolve the health-risk event may be automatically deployed.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
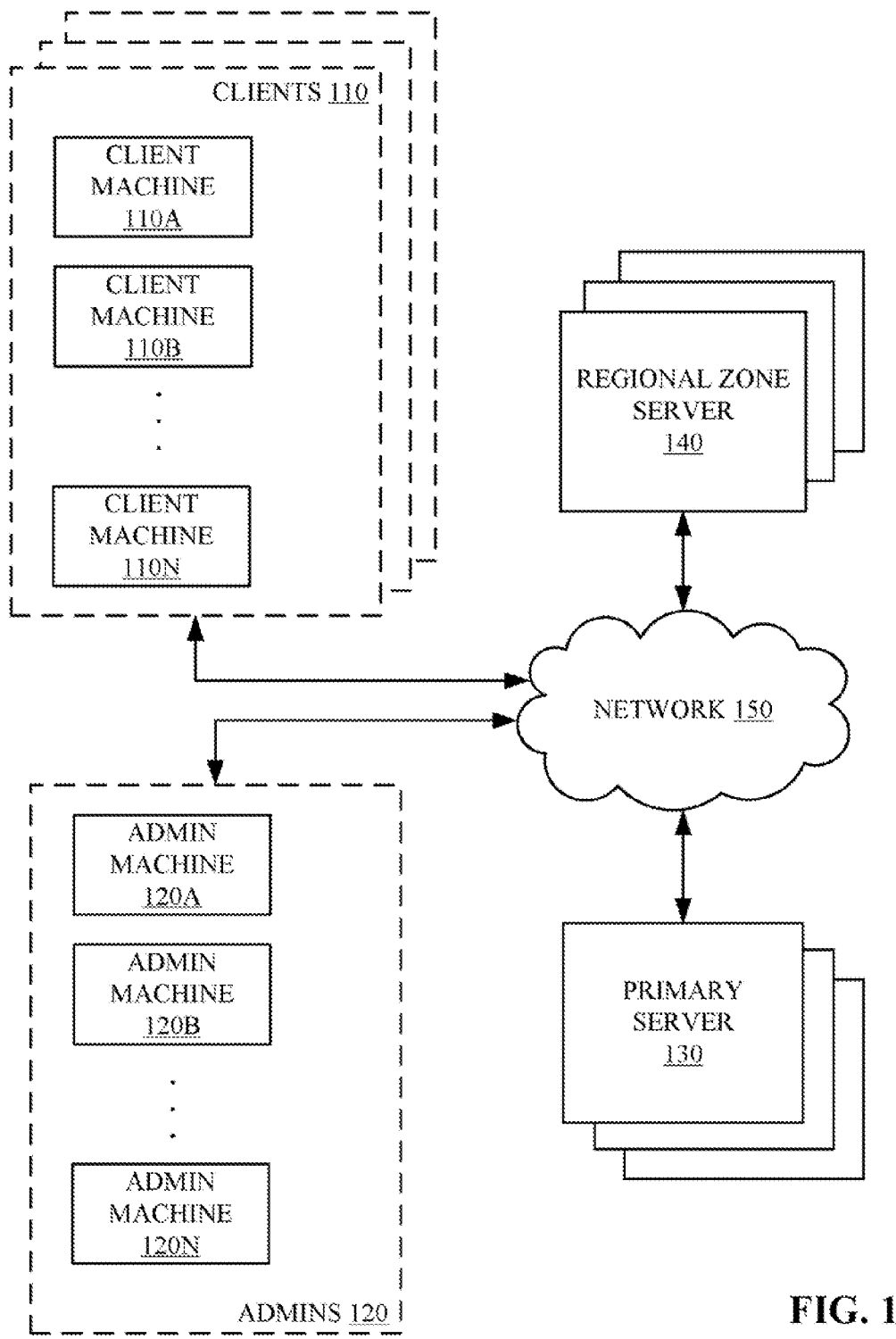
FIG. 1 is a block diagram illustrating an exemplary computer network in which embodiments of the present invention may operate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "retrieving", "determining", "identifying", "monitoring", "detecting", "generating", "triggering", "creating". "transmitting", "deploying", "executing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram illustrating an exemplary computer network 100 in which embodiments of the present invention may operate. Referring to FIG. 1, computer network 100 may be comprised of a plurality of client machines 110A-110N associated with end-users, referred to herein as clients 110, and a plurality of admin machines 120A-120N associated with users having administrative control, referred to herein as admins 120. Machines associated with clients 110 and admins 120 may be communicatively coupled, via a network 150, to one or more computer processing and storage accessible components including, but not limited to, one or more regional zone servers 140 and one or more primary servers 130. Network 150 may be a private network (e.g., a local area network (LAN), wide area network (WAN), intranet, etc.) or a public network (e.g., the Internet).

It should be noted that a plurality of clients 110 comprising one or more client machines that may be grouped together, spread over multiple localities and associated with one or more regional zone servers are envisioned in accordance with embodiments of the present invention. However, for purposes of brevity and not by way of limitation, embodiments of the present invention are described herein with reference to client machines 110A-110N associated with a regional zone server 140.

Figure 2A:
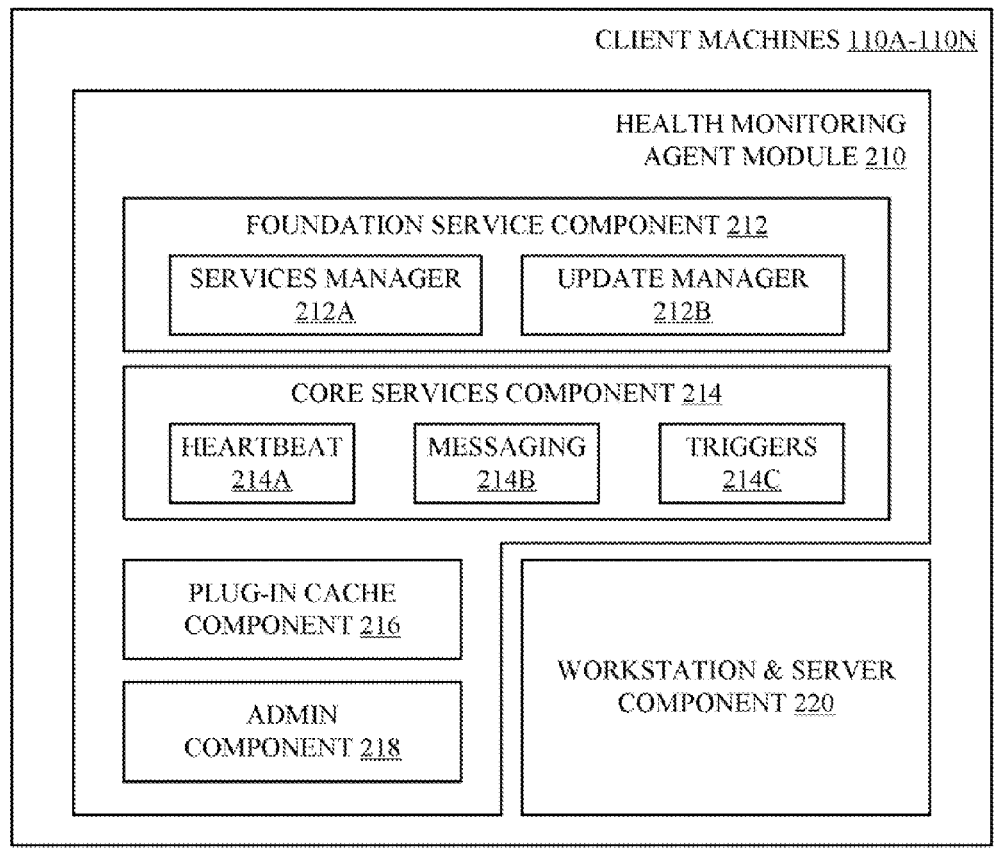
FIGS. 2A and 2B are block diagrams illustrating components of computer network elements illustrated in FIG. 1.
Figure 2B:
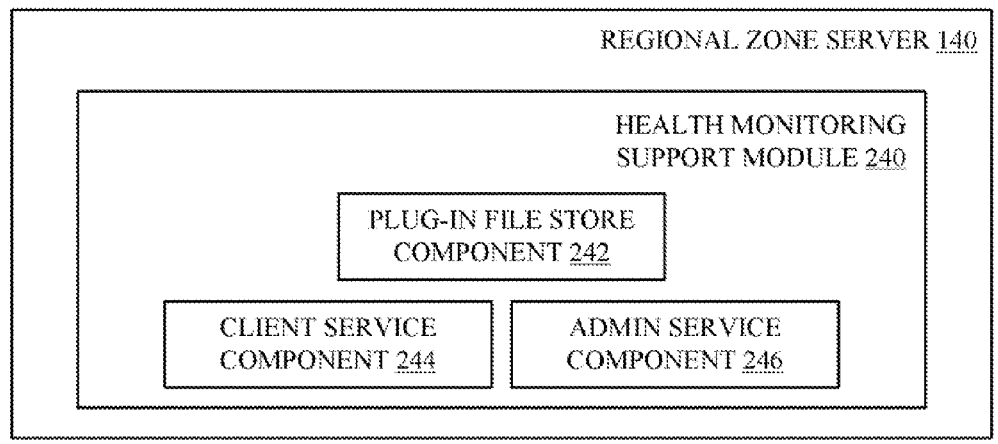

FIGS. 2A and 2B are block diagrams illustrating components that may be provided, respectively, on each client machines 110A-110N and each of regional zone servers 140, in accordance with embodiments of the present invention. Each of client machines 110A-110N and each of regional zone servers 140 may be configured, respectively, with a health monitoring agent module 210 and a health monitoring support module 240 for enabling the various processes of the present invention. Additionally, each of client machines 110A-110N may be configured with a workstation and server component 220, which may be an existing component of the operating systems running on each of client machines 110A-110N, to allow for execution of remote commands against any one of client machines 110A-110N.

Health monitoring agent module 210 may be configured to manage the elements needed for monitoring and maintaining client machines 110A-110N. Health monitoring agent module 210 may be comprised of one or more components for handling various processes of the present invention. Referring to FIG. 2A, health monitoring agent module 210 may comprise, for example, a foundation service component 212, a core services component 214, a plug-in cache component 216 and an admin component 218.

Foundation service component 212 may be a self-contained service running on each of client machines 110A-110N. Foundation service component 212 may comprise a services manager 212A and an update manager 212B. Services manager 212A may be tasked with ensuring various core services provided via health monitoring agent module 210 are properly enabled and running on each of client machines 110A-110N. Update manager 212B may be tasked with ensuring that updates, or repairs, to any of the various core services provided via health monitoring agent module 210 are received for application on each of client machines 110A-110N. Upon receiving instructions from regional zone server 140 to update or repair a core service, services manager 212A may operate in conjunction with update manager 212B to control downloading, executing and updating of the core service on any one of client machines 110A-110N.

Core services component 214 may also be a self-contained service running on client machines 110A-110N, which may encapsulate related functionality for maintaining the health of client machines 110A-110N. Services manager 212A may be configured to ensure that health service elements encapsulated in core services component 214 are up-to-date and, if retired, they are properly and timely removed. Services manager 212A may also be configured to ensure that if any of the health service elements encapsulated in core services component 214 fail, occurrence of the failure is logged and the relevant service restarted. The health service elements encapsulated in core services component 214 may include, but are not limited to, a core heartbeat service 214A, a core messaging service 214B and a core triggers service 214C. Although illustrated in FIG. 2A as two separate components, it is envisioned by those skilled in the art that foundation service component 212 and core services component 214 may also be represented as a single component comprising more or less of the foregoing elements identified herein.

Each of client machines 110A-110N may have an identifier associated with it. An identifier may be maintained in association with each of client machines 110A-110N for its entire lifetime to allow other systems to rely on the identifier as a single, globally unique, identifier of a particular client machine. Core heartbeat service 214A may be configured to maintain a periodic signal (i.e., a heartbeat), including the identifier of the client machine, with an assigned regional zone server 140 to confirm the operational status of a particular client machine. As long as core heartbeat service 214A is providing the heartbeat, the operational status of the particular client machine may remain active.

Additionally, the heartbeat generated by core heartbeat service 214A may be used to confirm authorized connectivity is being made with the assigned regional zone server 140. In one embodiment, if an unauthorized or unrecognized connection is made (e.g., if the client machine is improperly used or stolen), a heartbeat connection may be made to internet facing servers to record extra information about the particular client machine such as its IP address and ISP details. This data may then be used to facilitate risk management actions and retrieval of the particular client machine. In another embodiment, core heartbeat service 214A may be used to facilitate actions directed at erasing locally cached credentials and automatically powering down the particular client machine.

Core messaging service 214B may be configured to generate notifications to end users of client machines 110A-110N. Typically, e-mails informing end users of events which may impact their use of a client machine often go unread or are ignored. This behavior unnecessarily results in incident tickets being raised by end users. Using core messaging service 214B, notifications may be generated and delivered to client machines 110A-110N via a visual interface of health monitoring agent module 210 to be automatically displayed to end users. Core messaging service 214B ensures that generated notifications are acknowledged by end users. In one embodiment, end user acknowledgement of a notification generated by core messaging service 214B may be required before they will be permitted to further interact with their client machine.

Core trigger service 214C may be configured to detect and resolve health-risk events in connection with client machines 110A-110N. Core trigger service 214C may provide a mechanism to allow for application of one or more plug-ins to resolve detected health-risk events on client machines 110A-110N. A plug-in may be configured to request a notification be generated (e.g., via core messaging service 214B) identifying occurrence of a health-risk event for transmission to an end user if input is required, to take action to resolve the event and to log the activity taken in connection with resolving the event. A plug-in may be further configured to record metadata about the actions they perform, and this data may be periodically federated to identify trends for enabling strategic responses to chronic issues in a computing environment. A collection of plug-ins for addressing detected health-risk events on client machines 110A-110N may be maintained locally by plug-in cache component 216 of health monitoring agent module 210.

Admin component 218 may be provided as part of health monitoring agent module 210 to allow for remote interaction (e.g., by an entity with administrator-level privileges) with foundation service component 212 of health monitoring agent module 210. For example, via admin component 218, remote access of foundation service component 212 may be enabled to allow for a local service to be restarted, to update a local cache or to execute a specific plug-in outside of its normal schedule.

Health monitoring support module 240 of at least one regional zone server 140 may be configured to support health monitoring agent module 210 on each of client machines 110A-110N associated with the at least one regional zone server 140. Health monitoring support module 240 may be comprised of one or more components for handling various processes of the present invention. Referring to FIG. 2B, health monitoring support module 240 may comprise, for example, a plug-in file store component 242, a client service component 244 and an admin service component 246.

Plug-in file store component 242 may be tasked with storing data files needed to enable operations of health monitoring agent module 210. For example, plug-in file store component 242 may be configured to host data for use by foundation service component 212 and corresponding plug-ins needed for the core services provided via health monitoring agent module 210. Client service component 244 may be tasked with supporting the registration of new, and updating existing, client machines 110A-110N. Client service component 244 may also be tasked with maintaining a regional log of health-related events detected on client machines 110A-110N, and may store the log on one or more databases (not shown) communicatively coupled to at least one corresponding regional zone server 140.

Admin service component 246 may be tasked with maintaining the hygiene of client machines 110A-110N supported by the at least one regional zone server 140. For example, via admin service component 246, any one of client machines 110A-110N that are no longer checking-in (e.g., via a heartbeat) may be identified and automatically recovered, which may include re-installation of components corresponding to health monitoring agent module 210. Admin service component 246 may also be tasked with interrogating a global repository to sync new plug-ins and update local databases communicatively coupled to regional zone server 140 with new administrative directives. For example, if a plug-in has been modified or disabled in a central administrate database (e.g., a database communicatively coupled to primary server 130), admin service component 246 may be configured to update the plug-in in the local database communicatively coupled to regional zone servers 140 for updating the corresponding associated client machines 110A-110N.

Those skilled in the art will appreciate that agent module 210 and support module 240 may be configured with more or less modules and components to conduct the methods described herein with reference to FIGS. 3 and 4A-4C. As illustrated in FIGS. 3 and 4A-4C, each of corresponding methods 300, 400, 420 and 440 may be performed by processing logic that may comprise hardware (e.g., circuitry, dedicated logic, programmable logic, microcode, etc.), software (such as instructions run on a processing device), or a combination thereof. In one embodiment, methods 300, 400, 420 and 440 may be performed by one or more processing components associated with health monitoring agent module 210 of client machines 110A-110N and health monitoring support module 240 of regional zone servers 140.

Figure 3:
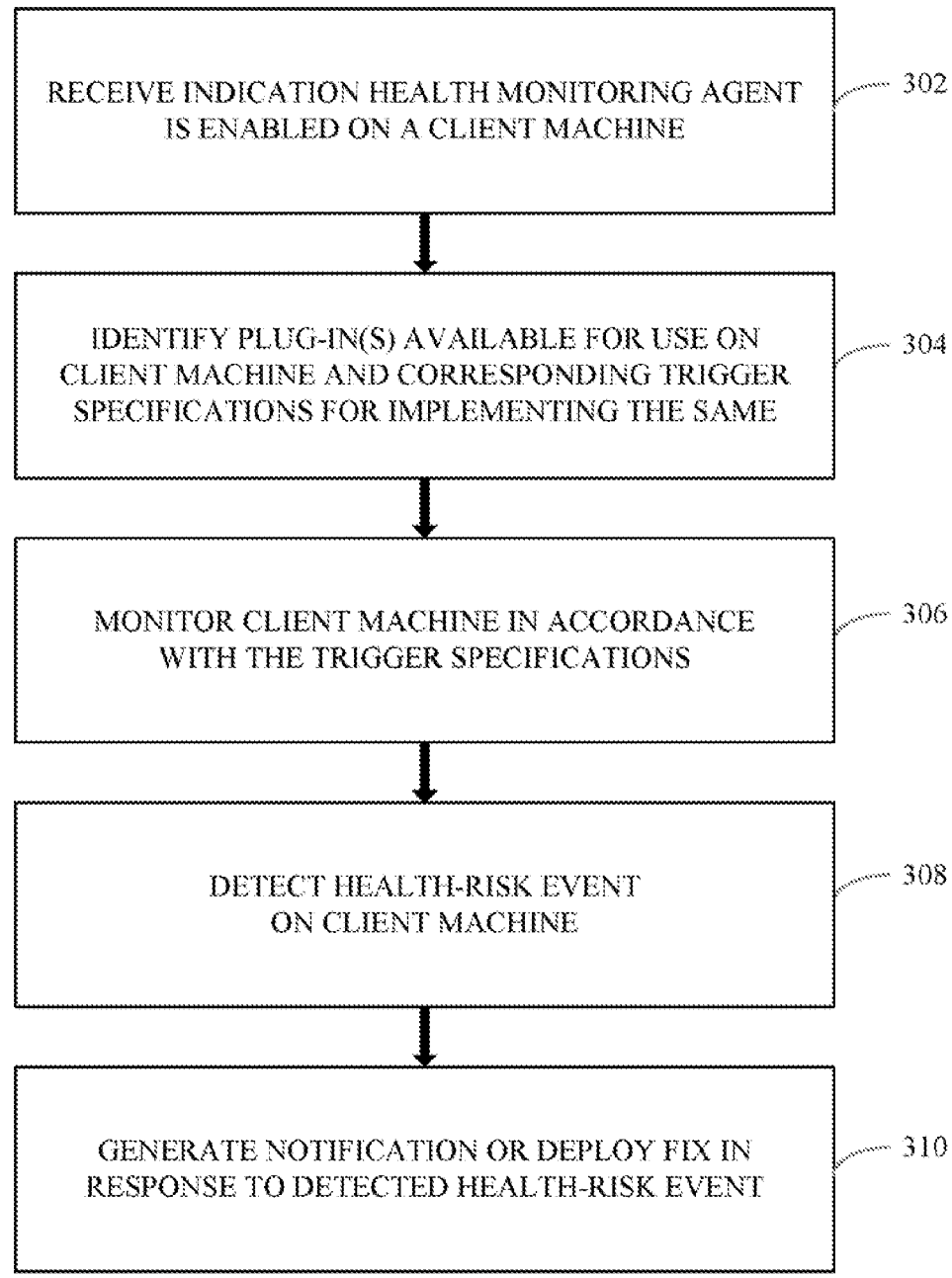
FIG. 3 is a flow diagram illustrating an embodiment of a method for monitoring the health status of a client machine.

FIG. 3 is a flow diagram illustrating a method 300 for monitoring the health status of client machines 110A-110N, according to an embodiment of the invention. Referring to FIG. 3, method 300 may be initiated upon receiving, at block 302, an indication that health monitoring agent module 210 of a client machine is enabled. The plug-ins available to the client machine, and corresponding trigger specifications for their use, may be identified, at block 304, in order to monitor, at step 306, whether the client machine is operating within desired parameters as defined, for example, by threshold values of the trigger specifications. In one embodiment, the health status of the client machine may be monitored in real-time. In another embodiment, the health status of the client machine may be monitored and have health-related remedial actions taken in accordance with pre-defined schedule.

When a health-risk event is detected, at block 308, a notification may be generated or a fix may be deployed, at block 310, to remedy the detected health-risk event. The generated notification may be communicated to the end user of the client machine, indicating that a particular action needs to be taken within a specified period of time to remedy the detected health-risk event. The fix may be deployed automatically if a predetermined period of time has passed after having first notified the end user of the detected health-risk event or, alternatively, it may be deployed immediately after initial detection of the health-risk event if it is classified as a high-priority health-risk.

Plug-ins to remedy detected health-risk events may be provided on each of client machines 110A-110N. A different collection of plug-ins may be made available to one or more groups of client machines 110A-110N. Additionally, different threshold values may be set for trigger specifications on one or more groups of client machines 110A-110N to determine when a health-risk event has occurred and to deploy the corresponding plug-in for resolving the same. The plug-ins and threshold values of trigger specifications for a grouping of client machines may be determined, for example, based on the regional zone the grouping of client machines are associated with, desired monitoring requirements for a select group of end users, frequently occurring health-risk events, past usage statistics or any combination thereof.

Figure 4A:
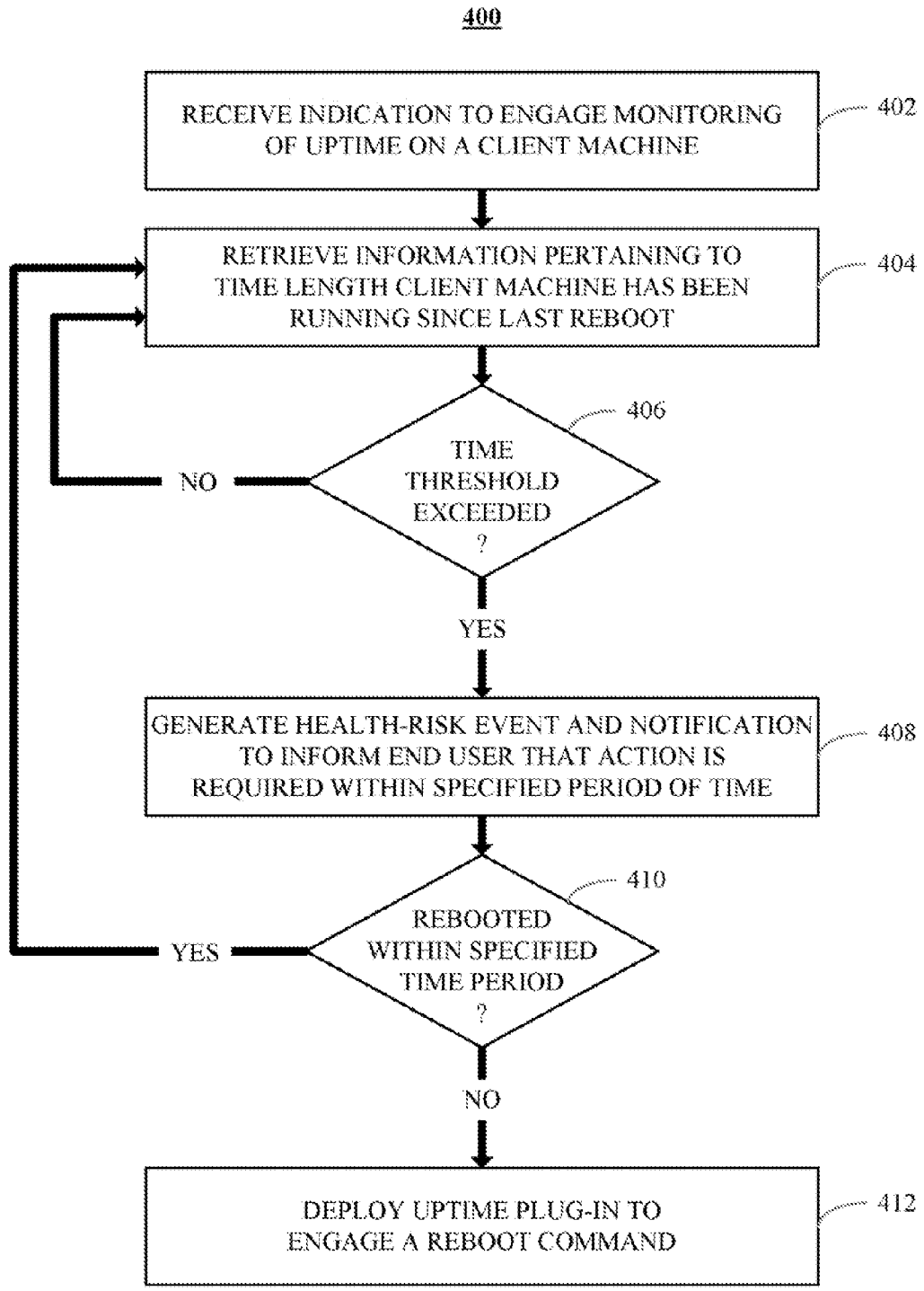
FIGS. 4A-4C are flow diagrams illustrating embodiments of methods for, respectively, managing uptime of a client machine, managing resource usage by a client machine, and managing disk space utilization on a client machine.

FIG. 4A is a flow diagram illustrating a method 400 for managing uptime of a client machine, according to an embodiment of the invention. Referring to FIG. 4A, method 400 may be initiated upon receiving, at block 402, an indication to engage in monitoring of uptime, via health monitoring agent module 210, associated with a client machine. Information pertaining to the length of time a client machine has been running since the last reboot may be retrieved, at block 404, in order to determine, at block 406, whether a designated time threshold value has been exceeded. For example, a trigger specification may be set that requires a reboot of the client machine at least once every 48 hours (i.e., the time threshold value). In one embodiment, determining whether the time threshold value has been exceeded may be measured intermittently according to a pre-defined monitoring schedule. In an alternate embodiment, determining whether the time threshold value has been exceeded may be monitored continuously.

When the time lapsed since the last reboot is determined, at block 406, to exceed the designated time threshold value, a health-risk event and a corresponding notification may be generated, at block 408. The notification may inform an end user of the occurrence of the event and the action required, as well as the time period allotted for taking the action, to remedy the health-risk associated with the same. For example, the action to remedy the detected health-risk event representative of an uptime exceeding desired uptime parameters for optimal performance may be a required reboot of the client machine.

A determination may be made, at block 410, whether the end user action required is taken within the time period allotted for resolution of the detected event. If the action required is not taken by the end user within the allotted time period, health monitoring agent module 210 may automatically take action, at block 412, deploying the uptime plug-in residing on the client machine to engage a reboot command. In one embodiment, the client machine may be automatically restarted in the off hours when the end user is not using the client machine.

Figure 4B:
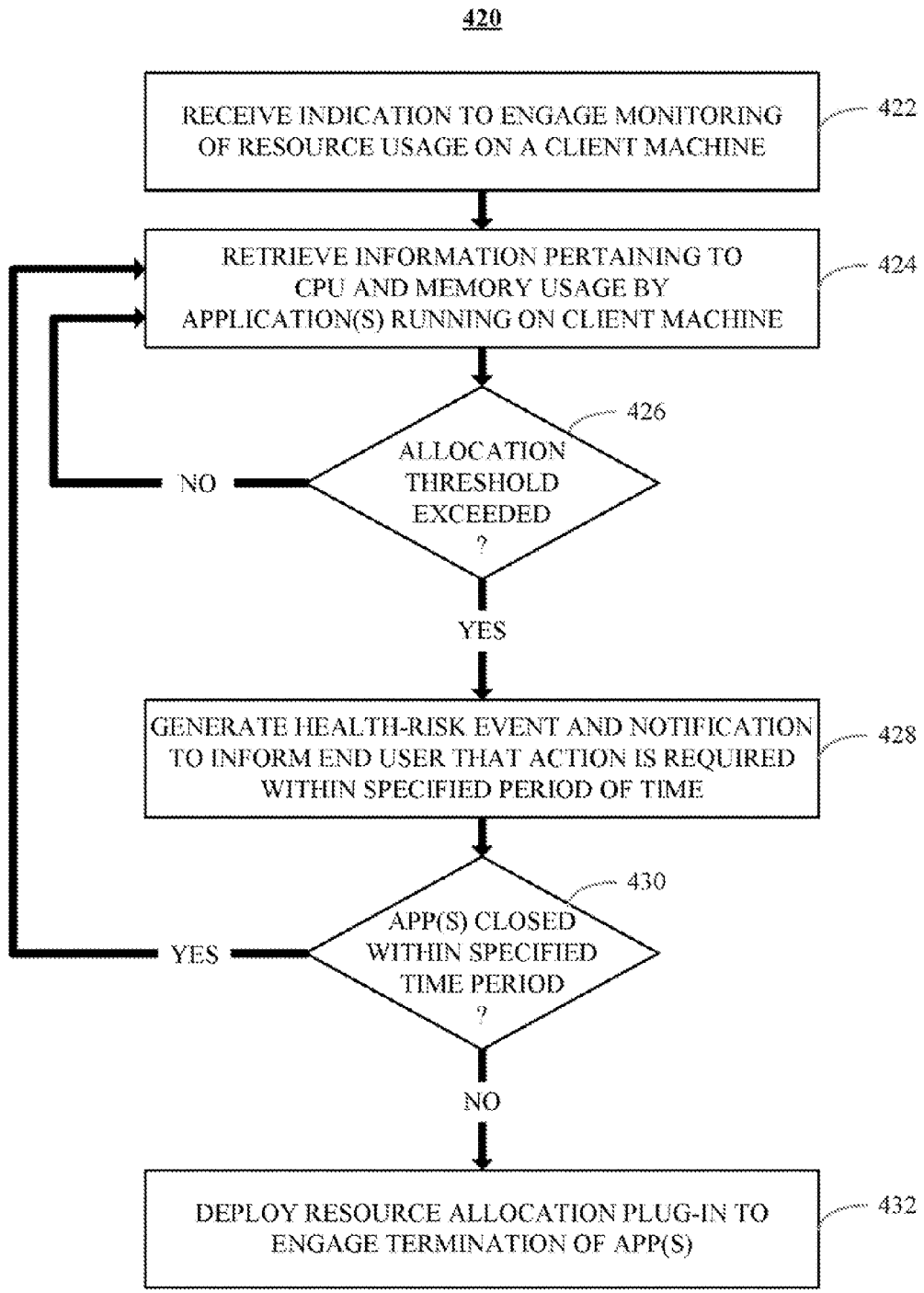

FIG. 4B is a flow diagram illustrating a method 420 for managing resource usage by a client machine, according to an embodiment of the invention. Referring to FIG. 4B, method 420 may be initiated upon receiving, at block 422, an indication to engage in monitoring of resources being used and the level at which they are being used, via health monitoring agent module 210, by one or more applications running on a client machine. Information pertaining to usage of CPU, memory, other computing resources or a combination thereof by one or more applications may be retrieved, at block 424, in order to determine, at block 426, whether designated resource allocation threshold values have been exceeded. For example, a trigger specification may be set that identifies allocation threshold values for the optimal use of resources by the one or more applications running on the client machine.

When the use of resources by the one or more applications is determined, at block 426, to exceed the designated allocation threshold values, a health-risk event and a corresponding notification may be generated, at block 428. The notification may inform an end user of the occurrence of the event and the action required, as well as the time period allotted for taking the action, to remedy the health-risk associated with the same. For example, the action to remedy the detected health-risk event representative of resource use exceeding desired allocation parameters for optimal performance may be a required termination of the one or more applications running on the client machine.

A determination may be made, at block 430, whether the end user action required is taken within the time period allotted for resolution of the detected event. If the action required is not taken by the end user within the allotted time period, health monitoring agent module 210 may automatically take action, at block 432, deploying the resource allocation plug-in residing on the client machine to engage in termination of one or more applications running on the client machine. In one embodiment, a determination as to which applications to terminate may be based on priority levels assigned to the one or more applications. Priority levels may be assigned, for example, based on predefined administrator-level settings, the frequency of the applications prior usage or any other applicable measure.

Figure 4C:
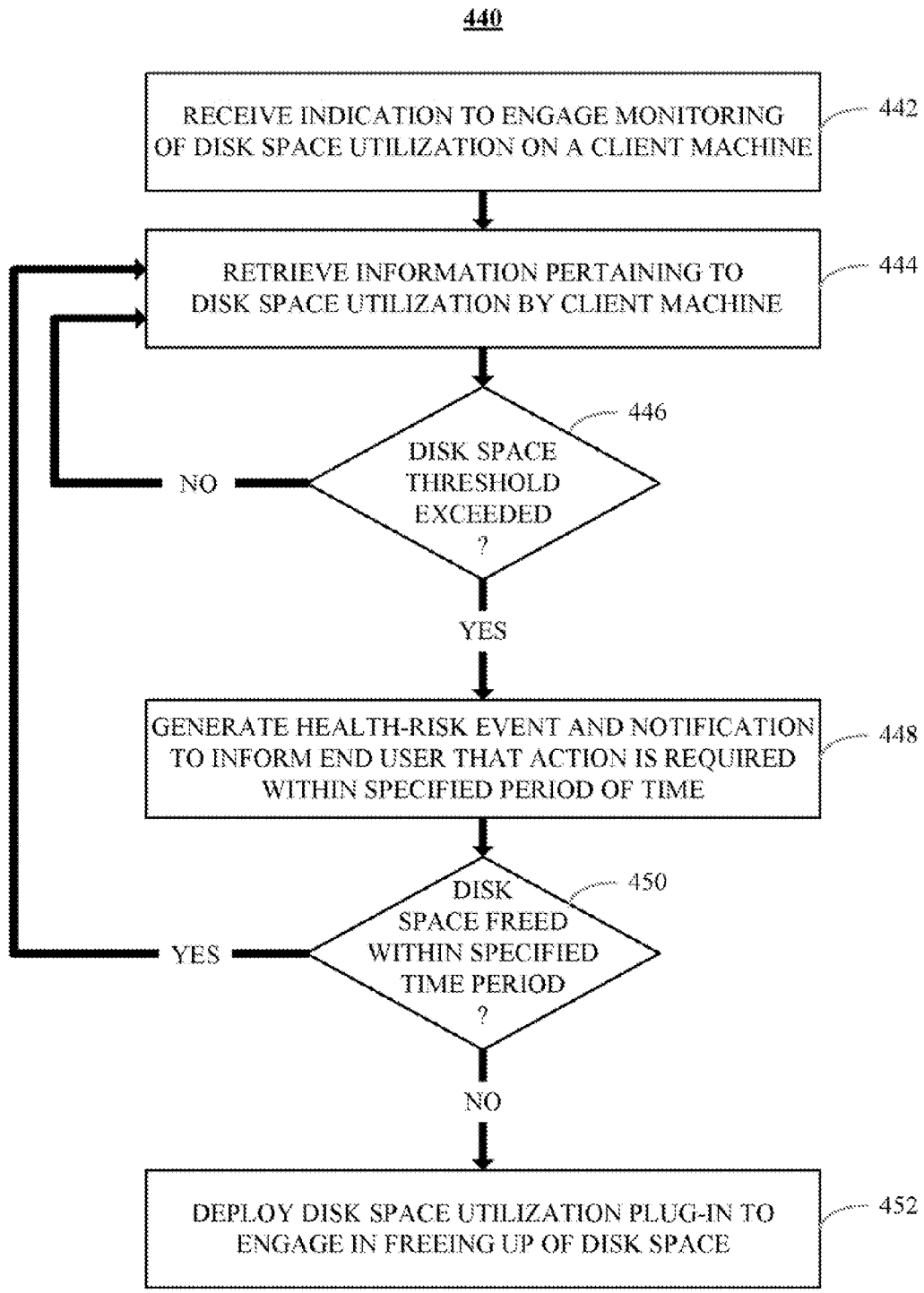

FIG. 4C is a flow diagram illustrating a method 440 for managing disk space utilization on a client machine, according to an embodiment of the invention. Referring to FIG. 4C, method 440 may be initiated upon receiving, at block 442, an indication to engage in monitoring of disk space utilization, via health monitoring agent module 210, by a client machine. Information pertaining to disk space utilization may be retrieved, at block 444, in order to determine, at block 446, whether a designated disk space threshold value has been exceeded. For example, a trigger specification may be set that identifies a value representative of low disk space on the client machine.

When disk space utilization is determined, at block 446, to exceed a designated threshold value, a health-risk event and a corresponding notification may be generated, at block 448. The notification may inform an end user of the occurrence of the event and the action required, as well as the time period allotted for taking the action, to remedy the health-risk associated with the same. For example, the action to remedy the detected health-risk event representative of low disk space may be a required disk cleanup or migration of data to disk space not local to the client machine.

A determination may be made, at block 450, whether the end user action required is taken within the time period allotted for resolution of the detected event. If the action required is not taken by the end user within the allotted time period, health monitoring agent module 210 may automatically take action, at block 452, deploying the disk space utilization plug-in residing on the client machine to engage a disk cleanup utility (e.g., to remove temporary and deleted files) or migrate data files to a disk space location on a remote server designated for the end user. In one embodiment, a determination as to which data files is to be migrated may be based on how often data files are accessed.

Figure 5:
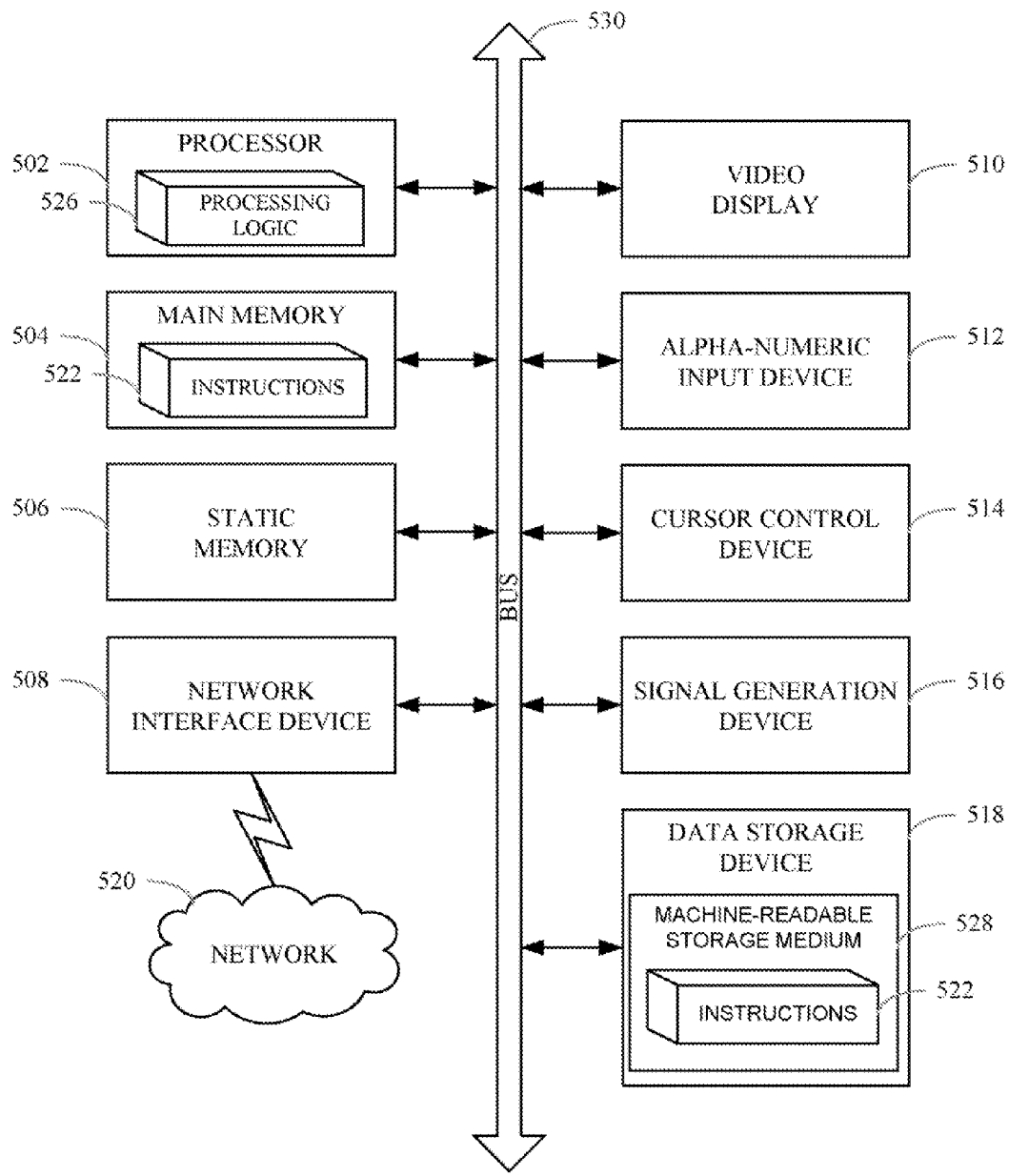
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 may be comprised of a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute processing logic 526 for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 528 having one or more sets of instructions (e.g., software 522) embodying any one or more of the methodologies of functions described herein. For example, software 522 may store instructions for maintaining the health of a machine. Software 522 may also reside, completely or at least partially, within main memory 504 and/or within processing device 502 during execution thereof by computer system 500; main memory 504 and processing device 502 also constituting machine-readable storage media. Software 522 may further be transmitted or received over a network 520 via network interface device 508.

Machine-readable storage medium 528 may also be used to store instructions for maintaining the health of a machine. While machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting.

Therefore, references to details of various embodiments are not intended to limit the scope of the claims, which in themselves recite only those features regarded as the invention.

What is claimed is:

1. A computer-implemented method for maintaining the operational health of at least one local machine in a computer network, the computer network connecting multiple local machines operated by users and at least one regional zone machine, said method comprising:
   storing instructions in a nontransitory electronic database;
   implementing a computer processor for accessing the stored instructions in the database and executing the instructions to perform steps including:
      utilizing the at least one regional zone machine for managing a plurality of plug-ins disposed on the local machines for resolving health risk related events;
      identifying a plug-in for resolving a detected health risk event from the plurality of plug-ins for resolving health risk related events, the plug-in permitted for use on the at least one local machine, said plug-in being a purpose-specific plug-in associated with the detected health-risk event, and said plug-in having one or more trigger specifications to allow deployment of said plug-in on said local machine;
      monitoring a health status of said local machine according to said one or more trigger specifications, said trigger specifications each having a pre-defined threshold value representative of optimal operation of said local machine;
      identifying at least one current threshold value associated with operation of said local machine;
      detecting said health-risk event upon determining said at least one current threshold value exceeds said pre-defined threshold value;
      generating a notification associated with detection of said health-risk event for communication to a user of said local machine, the notification requesting user action;
      determining a priority of said health-risk event;
      monitoring a status of the user action to determine if the user action is incomplete; and
      deploying said plug-in when the user action is incomplete in response to said detected health-risk event, said plug-in configured to automatically resolve said detected health-risk event on the local machine based on the priority of the health-risk event.

2. The computer-implemented method of claim 1, wherein said notification identifies a required action, and a time period for executing said required action, to resolve said detected health-risk event.

3. The computer-implemented method of claim 2, wherein said plug-in for resolving said detected health-risk event is deployed after expiration of said time period for executing said required action.

4. The computer-implemented method of claim 1, wherein said plug-in is provided for resolving a health-risk event representative of an uptime exceeding desired uptime parameters for optimal performance of said local machine.

5. The computer-implemented method of claim 1, wherein said plug-in is provided for resolving a health-risk event representative of resource use exceeding desired allocation parameters for optimal performance of said local machine.

6. The computer-implemented method of claim 1, wherein said plug-in is provided for resolving a health-risk event representative of low disk space on said local machine.

7. The computer-implemented method of claim 1, further comprising reporting information associated with detection and resolution of said health-risk event to a regional zone machine communicatively coupled to said local machine, said regional zone machine configured to provide support to monitoring of said health status of said local machine.

8. The method of claim 1, wherein the local machine communicates with an assigned regional zone machine, and the method further comprises generating a core heartbeat from the local machine enabling the assigned regional server to confirm authorized connectivity.

9. A computer system for maintaining the operational health of at least one local machine in a computer network connecting multiple local machines and at least one regional zone machine, the system comprising:
 a memory storing instructions; and
 at least one processing device communicatively coupled to said memory, said processing device configured to:
  utilize the at least one regional zone machine for managing a plurality of plug-ins disposed on the local machines for resolving health risk related events;
  identify a plug-in for resolving a detected health risk event from a plurality of plug-ins for resolving health risk related events, the plug-ins permitted for use on the at least one local machine, said plug-in being a purpose-specific plug-in associated with the detected health-risk event, and said plug-in having one or more trigger specifications to allow deployment of said plug-in on said local machine;
  monitor a health status of said local machine according to said one or more trigger specifications, said trigger specifications each having a pre-defined threshold value representative of optimal operation of said local machine;
  identify at least one current threshold value associated with operation of said local machine;
  detect said health-risk event upon determining said at least one current threshold value exceeds said pre-defined threshold value;
  generate a notification associated with detection of said health-risk event for communication to a user of said local machine, the notification requesting user action;
  determine a priority of said health-risk event;
  monitor a status of the user action to determine if the user action is incomplete; and
  deploy said plug-in when the user action is incomplete in response to said detected health-risk event, said plug-in configured to automatically resolve said detected health-risk event based on the priority of the health-risk event.

10. The computer system of claim 9, wherein said notification identifies a required action, and a time period for executing said required action, to resolve said detected health-risk event.

11. The computer system of claim 10, wherein said plug-in for resolving said detected health-risk event is deployed after expiration of said time period for executing said required action.

12. The computer system of claim 9, wherein said plug-in is provided for resolving a health-risk event representative of an uptime exceeding desired uptime parameters for optimal performance of said local machine.

13. The computer system of claim 9, wherein said plug-in is provided for resolving a health-risk event representative of resource use exceeding desired allocation parameters for optimal performance of said local machine.

14. The computer system of claim 9, wherein said plug-in is provided for resolving a health-risk event representative of low disk space on said local machine.

15. The computer system of claim 9, further comprising a reporting engine for reporting information associated with detection and resolution of said health-risk event to a regional zone machine communicatively coupled to said local machine, said regional zone machine configured to provide support to monitoring of said health status of said local machine.

16. A non-transitory computer-readable storage medium programmed to include instructions that, when executed by a processing device, cause the processing device to perform a method for maintaining the operational health of at least one local machine in a computer network connecting multiple local machines and at least one regional zone machine, said method comprising:
 utilizing the at least one regional zone machine for managing a plurality of plug-ins disposed on the local machines for resolving health risk related events;
 identifying a plug-in for resolving a detected health risk event from the plurality of plug-ins for resolving health risk related events, the plug-ins permitted for use on the at least one local machine, said plug-in being a purpose-specific plug-in associated with the detected health-risk event, and said plug-in having one or more trigger specifications to allow deployment of said plug-in on said local machine;
 monitoring a health status of said local machine according to said one or more trigger specifications, said trigger specifications each having a pre-defined threshold value representative of optimal operation of said local machine;
 identifying at least one current threshold value associated with operation of said local machine;
 detecting said health-risk event upon determining said at least one current threshold value exceeds said pre-defined threshold value;
 generating a notification associated with detection of said health-risk event for communication to a user of said local machine, the notification requesting user action;
 determining a priority of said health-risk event;
 monitoring a status of the user action to determine if the user action is incomplete; and
 deploying said plug-in when the user action is incomplete in response to said detected health-risk event, said plug-in configured to automatically resolve said detected health-risk event, based on the priority of said health-risk event.

* * * * *